United States Patent
Portuesi

(10) Patent No.: US 6,963,906 B2
(45) Date of Patent: *Nov. 8, 2005

(54) SYSTEM AND METHOD FOR ACTIVATING UNIFORM NETWORK RESOURCE LOCATORS DISPLAYED IN MEDIA BROADCAST

(75) Inventor: Michael J. Portuesi, San Francisco, CA (US)

(73) Assignee: Microsoft Corporation, Redmond, WA (US)

(*) Notice: Subject to any disclaimer, the term of this patent is extended or adjusted under 35 U.S.C. 154(b) by 232 days.

This patent is subject to a terminal disclaimer.

(21) Appl. No.: 10/329,080

(22) Filed: Dec. 23, 2002

(65) Prior Publication Data

US 2003/0093564 A1 May 15, 2003

Related U.S. Application Data

(63) Continuation of application No. 09/393,250, filed on Sep. 10, 1999, now Pat. No. 6,499,057, which is a continuation of application No. 08/733,884, filed on Oct. 18, 1994, now Pat. No. 5,774,666.

(51) Int. Cl.$^7$ ............................................... G06F 13/00
(52) U.S. Cl. ....................... 709/217; 719/328; 348/564
(58) Field of Search ................................ 709/217, 219; 719/328, 329; 348/12, 564

(56) References Cited

U.S. PATENT DOCUMENTS

| | | |
|---|---|---|
| 5,014,125 A | 5/1991 | Pocock et al. |
| 5,508,754 A | 4/1996 | Orphan |
| 5,539,871 A | 7/1996 | Gibson |
| 5,589,892 A | 12/1996 | Knee et al. |
| 5,606,655 A | 2/1997 | Arman et al. |
| 5,640,193 A | 6/1997 | Wellner |
| 5,649,186 A | 7/1997 | Ferguson |
| 5,655,117 A | 8/1997 | Goldberg et al. |
| 5,708,845 A | 1/1998 | Wistendahl et al. |
| 5,774,664 A | 6/1998 | Hidary et al. |
| 5,774,666 A | 6/1998 | Portuesi |
| 5,778,181 A | 7/1998 | Hidary et al. |
| 5,918,012 A | 6/1999 | Astiz et al. |
| 6,014,137 A * | 1/2000 | Burns ......................... 345/747 |
| 6,205,231 B1 * | 3/2001 | Isadore-Barreca et al. .. 382/103 |
| 6,499,057 B1 | 12/2002 | Portuesi |

OTHER PUBLICATIONS

Tan et al., "Voasic: With a V for Video—Very Amazing!," Newsletter from University of Illinois Urbana–Champaign; Winter 1996, 7 pages.

Chen et al., "Real Time Video and Audio in the World Wide Web," Real Time Video and Audio in the World Wide Web, 18 pages, printed Apr. 3, 2000.

Herbst, "Webstorming in Paris," Internet World, Sep. 1996, 6 pages.

(Continued)

*Primary Examiner*—Viet D. Vu
(74) *Attorney, Agent, or Firm*—Leydig, Voit & Mayer, Ltd.

(57) ABSTRACT

A system and method are provided for displaying a uniform network resource locator embedded in a time-based medium. In one embodiment, the time-based medium can be a movie file having an uniform network resource locator embedded by association with a track in the movie file. In another embodiment, the time-based medium can be a video signal having encoded information defining an embedded uniform network resource locator. An output for display is generated based upon the time-based medium where display of the output shows the embedded uniform network resource locator to a user such that the embedded uniform network resource locator is active during display of the output. The user is then allowed to activate the embedded uniform network resource locator. In response to activation by the user, the embedded uniform network resource locator is followed to retrieve a resource addressed by the embedded uniform network resource locator.

15 Claims, 2 Drawing Sheets

OTHER PUBLICATIONS

Article entitled "Apple QuickTime VR Version 2.0 to Bring Programmability, Motion and Sound to Leading Web and CD–ROM Virtual Reality Technology," AMSYS Hot News, Jun. 10, 1996, 3 pages.

Article entitled "Multimedia Hypervideo Links for Full Motion Videos," IBM Technical Disclosure Bulletin, vol. 37, No. 04A, Apr. 1994, 1 page.

Article entitled "Visual Behavior of Multimedia Hypervideo Link: for Motion Video," IBM Technical Disclosure Bulletin, Jan. 1994, 1 page.

Movie Research Formats, Inside Macintosh: Quick Time, Published 1993 (copy not located).

AVI Filed with Hot Spots by David A. Feinleib; Aug. 16, 1993 (copy not located).

Visual Behavior of Multimedia Hypervideo Links for Motion Video, *IBM Technical Disclosure Bulletin*, 37:1, 2 pp. (Jan. 1994).

Multimedia Hypervideo Links for Full Motion Videos, *IBM Technical Disclosure Bulleting*, 37:4A, 1 p. (Apr. 1994).

Chen, "QuickTime® VR—An Image–Based Approach to Virtual Environment Navigation," SIGGRAPH 95 (Los Angeles, CA; Aug. 6–11, 1995).

Chen et al., "Real Time Video and Audio in the World Wide Web," 18 pp. (Mar. 8, 2000).

Herbst, "Webstorming in Paris," *Internet World*, 6 pp. (Mar. 3, 2000).

\* cited by examiner

SYSTEM AND METHOD FOR ACTIVATING UNIFORM NETWORK RESOURCE LOCATORS DISPLAYED IN MEDIA BROADCAST

This patent application is a continuation of U.S. patent application Ser. No. 09/393,250, filed Sep. 10, 1999, (now U.S. Pat. No. 6,499,057, issued Dec. 24, 2002) which is a continuation of U.S. patent application Ser. No. 09/105,011, filed Jun. 26, 1998 (now U.S. Pat. No. 5,987,509, issued Nov. 16, 1999), which is a continuation of U.S. patent application Ser. No. 08/733,884, filed Oct. 18, 1994 (now U.S. Pat. No. 5,774,666, issued Jun. 30, 1998).

TECHNICAL FIELD OF THE INVENTION

This invention relates in general to the field of electronic systems, and more particularly to a system and method for displaying uniform network resource locators embedded in a time-based medium.

BACKGROUND OF THE INVENTION

Uniform resource locators (URLs) are currently used to provide addressing of and access to resources on the public Internet and private intranets. These Internet/intranet URLs allow client systems of the network to request the documents or other resources from servers of the network by reference to the URL. The available resources generally include HTML Web pages as well as audio files and movie files that can be downloaded to a user's machine. The URLs for resources typically are displayed within Web pages either as hypertext links or as graphics hot spots and allow users to navigate the various resources available on the network. URLs can also be entered manually by a user in order to connect to a specific resource. When accessed, Web pages typically are loaded by a web browser, interpreted and then displayed to the user. Audio files and movie files, on the other hand, are usually downloaded as discrete files to the user's system and then played in a separate window using some form of playback application. In general, such audio and movie files provide a time-based medium understood and interpreted by the playback application to generate audio sounds and video displays.

Conventional movie playback applications include QUICK TIME, available from APPLE COMPUTERS, and VIDEO FOR WINDOWS, available from MICROSOFT. QUICK TIME VR, also available from APPLE COMPUTERS, is a playback application that plays files expressed in a spatial-based medium to allow viewing of a scene from multiple viewpoints. One use of VIDEO FOR WINDOWS is described in an article "AVI Files with Hot Spots", Technical Articles: Multimedia-Microsoft Development Library. This article describes specifying hot-spots for audio-video interleaved (AVI) files where the hot spots can be drawn on AVI files and saved in hot-spot information files which can be specified as a parameter when the AVI is played. The described AVI hot-spot functionality allows specifying beginning and ending frames for each hot spot, as long as two hot spots do not have the same beginning or ending frames. The described AVI hot-spot functionality also allows executing viewer commands and calling stand-alone applications when a hot spot is selected as well as to continue, stop or jump within the AVI file being played.

There are additional movie-type displays that can be created through the use of executable languages such as the use of JAVA applets to animate graphics. In addition, POINTCAST can be used to broadcast static screens over the public Internet or private intranets that are updated to provide a slide show presentation. Other conventional presentation software applications allow a user to build video into a presentation including DIRECTOR, available from MACROMEDIA, which allows a user to program a presentation which can include video. Relatively new technologies are also available that integrate common television with Internet web activity to allow a user to access the public Internet or private intranets using a web browser and to display the web browser's output on a television.

A problem with conventional audio files, movie files and other time-based media and their associated playback applications is that a discontinuity in the user's ability to navigate network resources is created during playback. This discontinuity is created by the user's not being allowed to activate URLs for other resources from within the playback window during playback. For example, playback of a conventional movie file could cause a URL to be displayed as text within the video, but the URL would not be an active hypertext link. If the user wanted to follow the displayed URL, the user would need to invoke a Web browser and manually enter the URL.

SUMMARY OF THE INVENTION

In accordance with the present invention, a system and method for displaying uniform network resource locators embedded in a time-based medium are provided that substantially eliminate or reduce disadvantages and problems associated with previously developed time-based media and playback applications.

In accordance with one aspect of the present invention, a method is provided for displaying a uniform network resource locator embedded in a time-based medium. In one embodiment, the time-based medium can be a movie file having a uniform network resource locator embedded by association with a track in the movie file. In another embodiment, the time-based medium can be a video signal having an encoded uniform network resource locator. An output for display is generated based upon the time-based medium where display of the output shows the embedded uniform network resource locator to a user and where the embedded uniform network resource locator is active during display of the output. The user is then allowed to activate the embedded uniform network resource locator. In response to activation by the user, the embedded uniform network resource locator is followed to retrieve a resource addressed by the embedded uniform network resource locator.

In accordance with another aspect of the present invention, a system is provided for displaying a uniform network resource locator embedded in a time-based medium. The system includes a data storage device storing a time-based medium having an embedded uniform network resource locator. A playback application is operable to access the data storage device. The playback application is further operable to read the time-based medium, interpret the time-based medium and generate an output for display. The output includes the embedded uniform network resource locator where the embedded uniform network resource locator is active. A display is operable to receive the output of the playback application and to display the output to a user of the system. A user input device is operable to provide information to the playback application such that the user can select and activate the embedded uniform network resource locator. If the embedded uniform network resource locator is activated, the playback application is operable to follow the embedded uniform network resource locator to retrieve a resource addressed by the embedded uniform network resource locator.

In accordance with a further aspect of the present invention, a system is provided for distributing a video signal having an encoded uniform network resource locator. The system includes an encoding system operable to generate a video signal including video and encoded information. The encoded information defines a uniform network resource locator embedded in the video. A decoding system is operable to receive the video signal. The decoding system is then further operable to decode the encoded information from the video signal, to display the video with the uniform network resource locator embedded in the video to a user, and to allow the user to select and activate the embedded uniform network resource locator. If the embedded uniform network resource locator is activated, the decoding system is operable to follow the embedded uniform network resource locator to retrieve a resource addressed by the embedded uniform network resource locator.

A technical advantage of the present invention is embedding uniform network resource locators in a time-based medium such that uniform network resource locators are active during playback of the time-based medium. This allows a user to activate links and connect to resources, for example, across the public Internet or private intranets during playback of the time-based medium. The uniform network resource locators can be displayed, for example, as hypertext links and as hot spots. In addition, the uniform network resource locators can be displayed and made active while the playback application performs VCR functions such as rewind, fast-forward, and frame advance.

Another technical advantage of the present invention is the ability to encode uniform network resource locators into a video signal such that the video signal can be transmitted across a distribution network or recorded. The video signal can then be received, the uniform network resource locators decoded from the video signal, and the video displayed with active uniform network resource locators.

A further technical advantage of the present invention is the ability to associate uniform network resource locators with various types of time-based media tracks, including image and audio tracks. In addition, transformations for hot spots can be specified for movement of hot spots within the playback display.

BRIEF DESCRIPTION OF THE DRAWINGS

A more complete understanding of the present invention and advantages thereof may be acquired by referring to the following description taken in conjunction with the accompanying drawings in which like reference numbers indicate like features, and wherein.

DETAILED DESCRIPTION OF THE INVENTION

Figure 1:
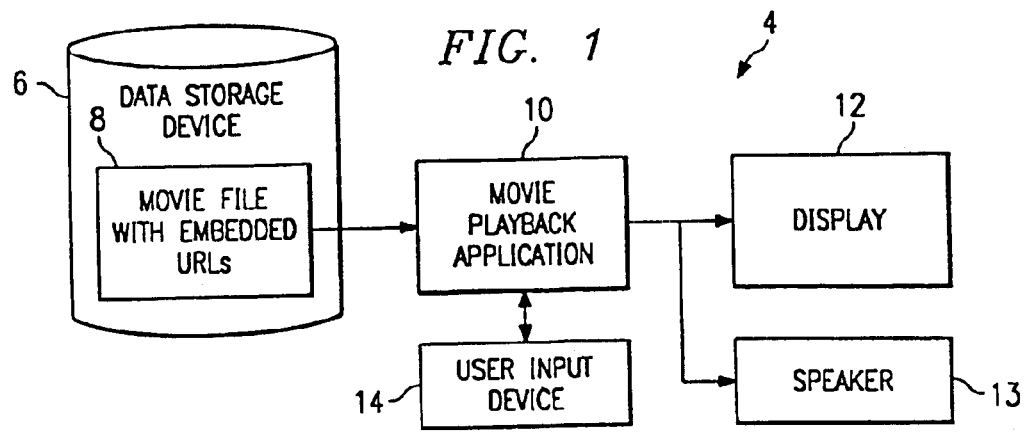
FIG. 1 is a block diagram of one embodiment of a system for displaying uniform network resource locators embedded in a time-based medium according to the teachings of the present invention.

FIG. 1 is a block diagram of one embodiment of a system for displaying uniform network resource locators embedded in a time-based medium according to the teachings of the present invention. As used herein, the term "uniform network resource locator" denotes an identifier of a network document or other resource, formatted in accordance with a uniform network protocol, such that computer clients of the network, for example, can request the document or resource from computer servers of the network by reference to the identifier. Internet/intranet URLs, formatted in accordance with HTTP protocol, are one example of a uniform network resource locator as that term is used herein. Although the embodiment of FIG. 1 and those of FIGS. 2–5 involve Internet/intranet URLs, the present invention is not intended nor should be construed to be limited to Internet/intranet URLs. In addition, the embodiments of FIGS. 1–5 involve movie files, but the present invention is not intended nor should be construed to be limited to movie files as the time-based medium.

The system of FIG. 1, indicated generally at 4, is implemented to display Internet/intranet URLs embedded in a movie file. System 4 includes a data storage device 6 which stores one or more movie files 8 that each have embedded URLs. One embodiment for embedding URLs within a movie file 8 is shown in and discussed with respect to FIGS. 2 and 3 below. System 4 also includes movie playback application 10 coupled to data storage device 6 and operable to read movie file 8, interpret movie file 8 including the embedded URLs, and provide video to be displayed to a user on a display 12 and audio to be played on a speaker 13. System 10 further includes user input device 14 coupled to movie playback application 16 which can comprise a keyboard and a mouse or other pointing device. A user can use user input device 14 to provide information to movie playback application 10 for selecting and activating embedded URLs.

In one embodiment of the present invention, system 10 is implemented on a personal computer or a computer workstation. In this embodiment, the personal computer or computer workstation includes a processor and memory in addition to data storage device 6, display 12, speaker 13 and user input device 14. Movie playback application 10 can be stored in data storage device 6, loaded into the memory and executed by the processor. When executed, movie playback application 10 instructs the processor to cause the personal computer or computer workstation to read and interpret movie file 8 and provide audio and video to display 12 and speaker 13.

Figure 2:
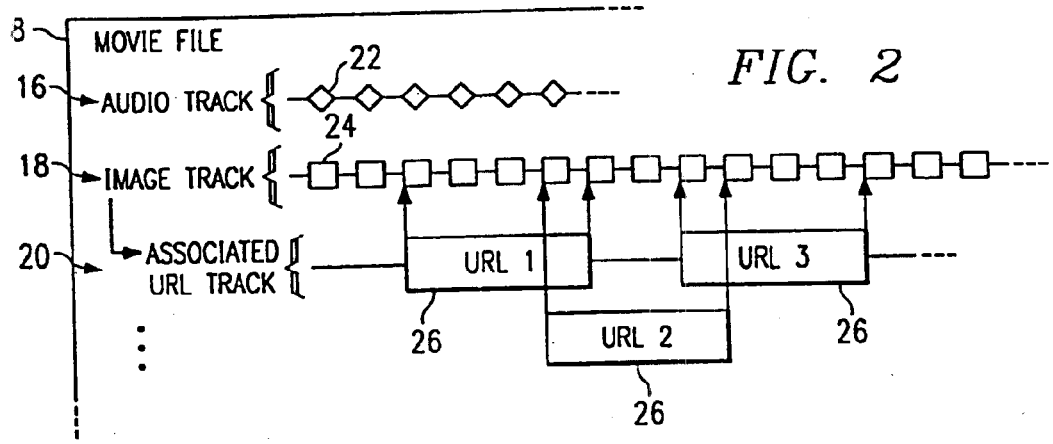
FIG. 2 is a diagram of one embodiment of Internet/intranet URLs embedded in a movie file according to the teachings of the present invention.

FIG. 2 is a diagram of one embodiment of Internet/intranet URLs embedded in a movie file 8 according to the teachings of the present invention. In general, movie files include a number of tracks which provide audio, image and other elements of a movie expressed in a time-based format. Each track defines a temporal relationship of its parts with respect to a time sequence of the entire movie file. Thus, there is also a temporal relationship between the various movie file tracks. In general, each track provides information about relative rate of playback, format of the data and corresponding samples with a particular period of time in which to display or play the sample. The movie playback application interprets the movie file tracks in order to generate the movie display and sound. In one embodiment of the present invention, movie file 8 is a QUICK TIME movie file, but other movie file formats can be used as well.

Movie file 8 has a plurality of tracks which include an audio track 16, an image track 18, and an associated URL track 20. Audio track 16 includes a plurality of audio samples 22 having a temporal relationship defined according to the format of movie file 8. Image track 18 includes a plurality of images 24 also having a temporal relationship defined according to the format of movie file 8. According to the present invention, URLs are embedded into movie file 8 by a URL track 20 that is associated with another track in movie file 8. In the embodiment of FIG. 2, URL track 20 is associated with image track 18 and includes a plurality of URLs 26 that are associated with a sequence of images 24. It should be understood that URLs 26 could also be associated with audio samples 22 in audio track 16 or with other parts of other tracks within movie file 8. It should also be understood that a plurality of URL tracks could be defined within movie file 8.

When movie file 8 is played, movie playback application 10 interprets audio track 16, image track 18 and associated URL track 20 in order to build the video and audio supplied to display 12 and speaker 13. Audio track 16 provides information about particular audio samples to be played at particular points in time. Image track 18 similarly provides information about images 24 that are to be displayed at particular points in time. According to the present invention, associated URL track 20 provides information about URLs to display and make active during certain periods of time with respect to images 24 in image track 18. URL track 20 can include information about where to place the URLs in addition to information about temporal sequence of the URLs. URL track 20 allows active URLs, such as hypertext links and hot spots, to be created within the movie display during playback of movie file 8. When an embedded URL is displayed, a user can select and activate the URL using user input device 14, and movie playback application 10 can follow the URL.

In this manner, one or more URLs can be embedded in a time-based medium such as a QUICK TIME movie file or other type of movie file. When embedded in movie file 8, one or more URLs 26 are temporally sequenced and spatially arranged as defined by one or more URL track 20. Each URL track 20 is associated with another track in movie file 8. Each URL 26 in each URL track 20 is then active for a given segment of the time during playback of movie file 8 according to the association with other tracks. As movie playback application 10 plays a movie file 8, it reads and interprets URL descriptions from URL tracks 20. Playback application 10 uses timing and placement information defined for each URL 26 to display the URL to a user at the appropriate time. If the associated track contains visual information, such as video, graphics or projective scenes, playback application 10 can use hot spot or hypertext information defined for the URL to display the URL directly over the visual display of the associated track. The URL can also be displayed to the user in a separate window. If the associated track does not contain visual information, such as an audio or MIDI track, playback application 10 can display the URL to the user in a separate window and allow the user to activate the URL. When the user activates a URL, movie playback application 10 can follow the URL and retrieve resources located at that URL. This can be accomplished using functionality built into playback application 8 or by invoking an external Web browser to follow the URL.

Figure 3:
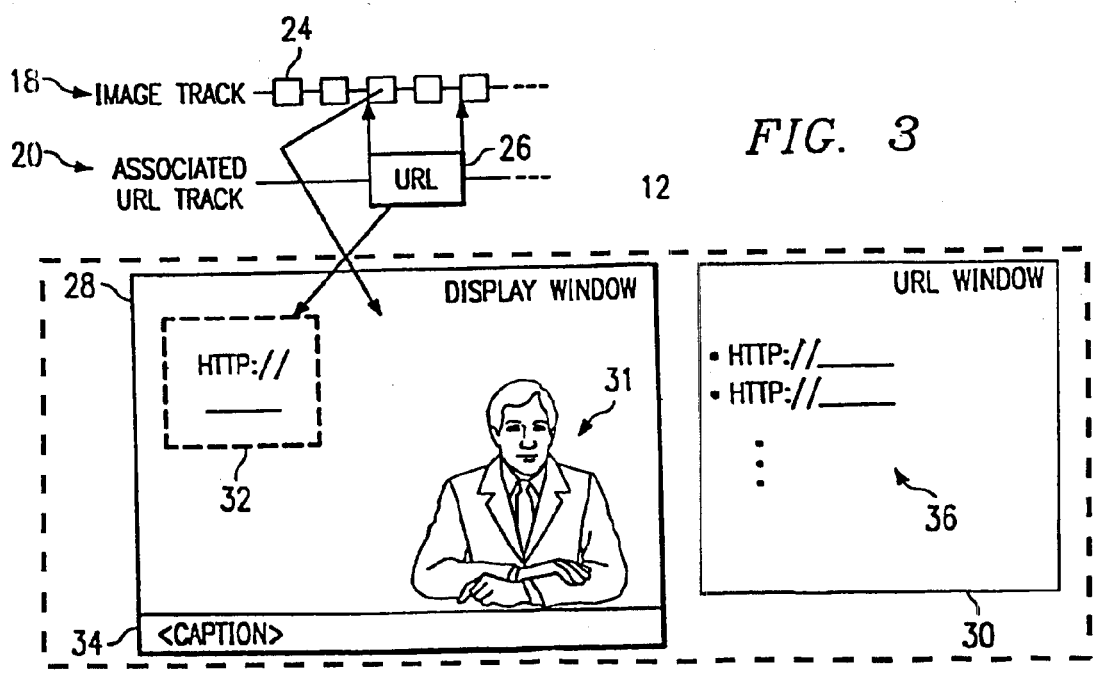
FIG. 3 is a diagram of one embodiment of displaying an embedded URL during playback of the movie file of FIG. 2 according to the teachings of the present invention.

FIG. 3 is a diagram of one embodiment of displaying an embedded URL during playback of movie file 8 of FIG. 2 according to the teachings of the present invention. In the embodiment of FIG. 3, embedded URL 26 of URL track 20 is defined in association with images 24 of image track 18; As time progresses, images 24 of image track 18 and any associated URL 26 of URL track 20 are interpreted and displayed. As shown in FIG. 3, display 12 can include a display window 28 and a URL window 30. Display window 28 is used by movie playback application 10 to display video 31 defined by image track 18. At the appropriate time, movie playback application 10 displays a hypertext link 32 defined by associated URL track 20. Hypertext link 32 is displayed and is active within display window 28 only for a specific period of time during playback of image track 18. After passing the last image 24 with which URL 26 is associated, hypertext link 32 is no longer displayed in display window 28. Display window 28 can include a caption 34 which provides a description of the area within display window 28 over which a pointing device, such as a mouse pointer, is positioned. For example, if the pointing device is positioned over hypertext link 32, caption 34 can provide a name for link 32 or provide the actual URL. URL window 30 is used by a movie playback application 10 to display a list 36 of URLs which have been active at some point during playback of movie file 8. In this manner, URL window 30 provides a history for the user to find and activate various URLs that have been displayed during playback of movie file 8.

Figure 4:
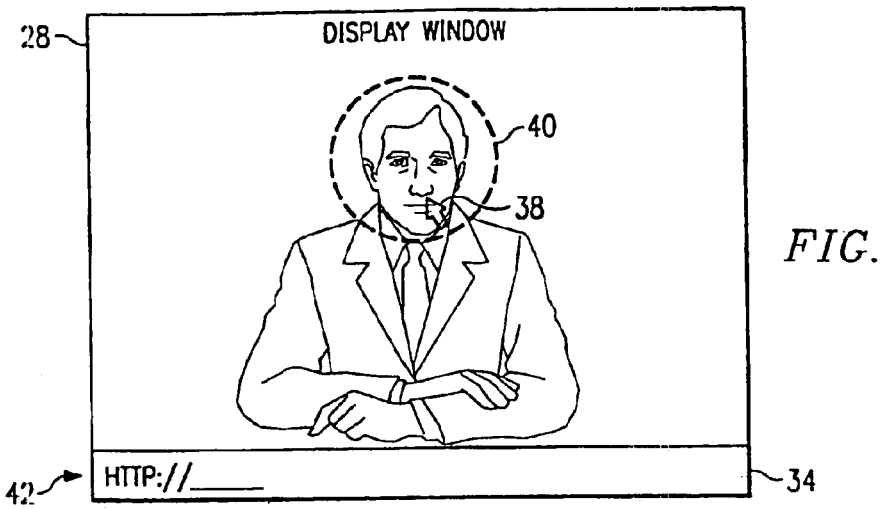
FIG. 4 is a diagram of one embodiment of highlighting a hot spot associated with an embedded URL during playback of the movie file of FIG. 2 according to the teachings of the present invention.

FIG. 4 is a diagram of one embodiment of highlighting a hot spot associated with an embedded URL during playback of movie file 8 of FIG. 2 according to the present invention. As shown, when a pointer 38 of a pointing device, such as a mouse, is positioned over a hot spot 40, hot spot 40 can be highlighted to indicate to the user that pointer 38 is positioned over hot spot 40. Also, caption 34 can display a URL 42 associated with hot spot 40. Thus, active embedded URLs in a video playback can be displayed as hot spots in addition to being displayed as hypertext links. In essence, the URL track can define an image map on top of a video display and provides active URLs to the user.

Embedding uniform network resource locators in a time-based medium according to the present invention provides significant advantages over conventional technologies. With respect to movie files, the present invention provides advantages, for example, over QUICK TIME movies and VIDEO FOR WINDOWS files, with or without, the MICROSOFT AVI hot-spot functionality. Uniform network resource locators are embedded into the time-based medium and do not need to be stored as separate items. The uniform network resource locators are active during playback and can be associated with any type of medium, including image, audio, etc. Further, transformations for hot spots can be specified so the hot spot can move during playback, including specifying a list of motions and key frames.

In one embodiment of the present invention, a QUICK TIME movie file format is used. QUICK TIME movie files have a container format in which data can be nested within data. Each piece of the data is generally called an atom and can have other atoms nested within it. Atoms can include information such as size, type of data, version, flags and the actual data. The general format of QUICK TIME video files is described in "Inside Macintosh: Quick Time", Chapter 4, Movie Resource Formats, Apple Computer, 1993, Addison-Wesley Publishing Co., ISBN 0-201-62201-7. The embedding of URLs in a QUICK TIME movie file can be implemented in a number of ways. For example, the embedded URLs can be implemented as a specially defined track atom. The URLs can also be embedded by having a movie atom with nested tracks and user defined data. The following tables provide an example of the data structures that could be used to embed URLs in a movie atom with nested user defined data, TABLE 1 shows a data format for a User Data List that could be used to associate a URL track with another track within the movie file.

TABLE 1

User Data List

| | |
|---|---|
| atom size | 4 bytes |
| type = 'urlt' | 4 bytes |
| version | 1 bytes |
| flags | 3 bytes |
| track ID (associated track) | 4 bytes |
| number of entries | 4 bytes |
| URL Descriptor Table (contains a series of URL Descriptor atoms) | variable |
| . | |
| . | |
| . | |

TABLE 2 shows a data format for the URL Descriptor Table nested within the User Data List of TABLE 1. The URL Descriptor Table could be used to define the various URLs within the URL track.

TABLE 2

URL Descriptor

| | |
|---|---|
| atom size | 4 bytes |
| type = 'urld' | 4 bytes |
| version | 1 bytes |
| flags | 3 bytes |
| time | 8 bytes |
| duration | 8 bytes |
| Data (URLstring and Hotspot atoms) | variable |
| . | |
| . | |
| . | |

TABLEs 3 and 4 show a data format for URLstring and Hotspot atoms nested within the URL Descriptor Table of TABLE 2. The URLstring and Hotspot atoms could be used to define each URL within the URL track.

TABLE 3

URLstring

| | |
|---|---|
| atom size | 4 bytes |
| type = 'urls' | 4 bytes |
| Data (e.g., string listing URL) | variable |

TABLE 4

Hotspot

| | |
|---|---|
| atom size | 4 bytes |
| type = 'hspt' | 4 bytes |
| Data (Shape atom, Motionlist atom, Caption atom) | variable |
| . | |
| . | |
| . | |

TABLEs 5, 6 and 7 show data formats for the Shape atoms, Motionlist atoms, and Caption atoms nested within the URLstring and Hotspot atoms of TABLEs 3 and 4. These atoms could be used to define characteristics of each hypertext link or hot spot.

TABLE 5

Shape atom

| | |
|---|---|
| atom size | 4 bytes |
| type = 'hshp' | 4 bytes |
| Shape bounding box | 8 bytes |
| Shape region data (e.g., list of 2D coordinates) | variable |

TABLE 6

Motionlist atom

| | |
|---|---|
| atom size | 4 bytes |
| type = 'hsml' | 4 bytes |
| Number of key frames in list | 4 bytes |
| Data (Hotspot Motion Key Frame table) | variable |
| . | |
| . | |
| . | |

TABLE 7

Caption atom

| | |
|---|---|
| atom size | 4 bytes |
| type = 'hscp' | 4 bytes |
| Data (e.g., text caption, typically title of URL) | variable |

TABLE 8 shows a data format for the Hotspot Motion Key Frame nested within the Motionlist atom of TABLE 6. The Hotspot Motion Key Frame could be used to define movement of a graphics hot spot within the display playback.

TABLE 8

Hotspot Motion Key Frame

| | |
|---|---|
| atom size | 4 bytes |
| type = 'hdkf' | 4 bytes |
| time | 8 bytes |
| duration | 8 bytes |
| Matrix (e.g., 3 × 3 matrix expressing transform for that period of time—system interpolates between key frames to transform hot spot) | 36 |

Figure 5:
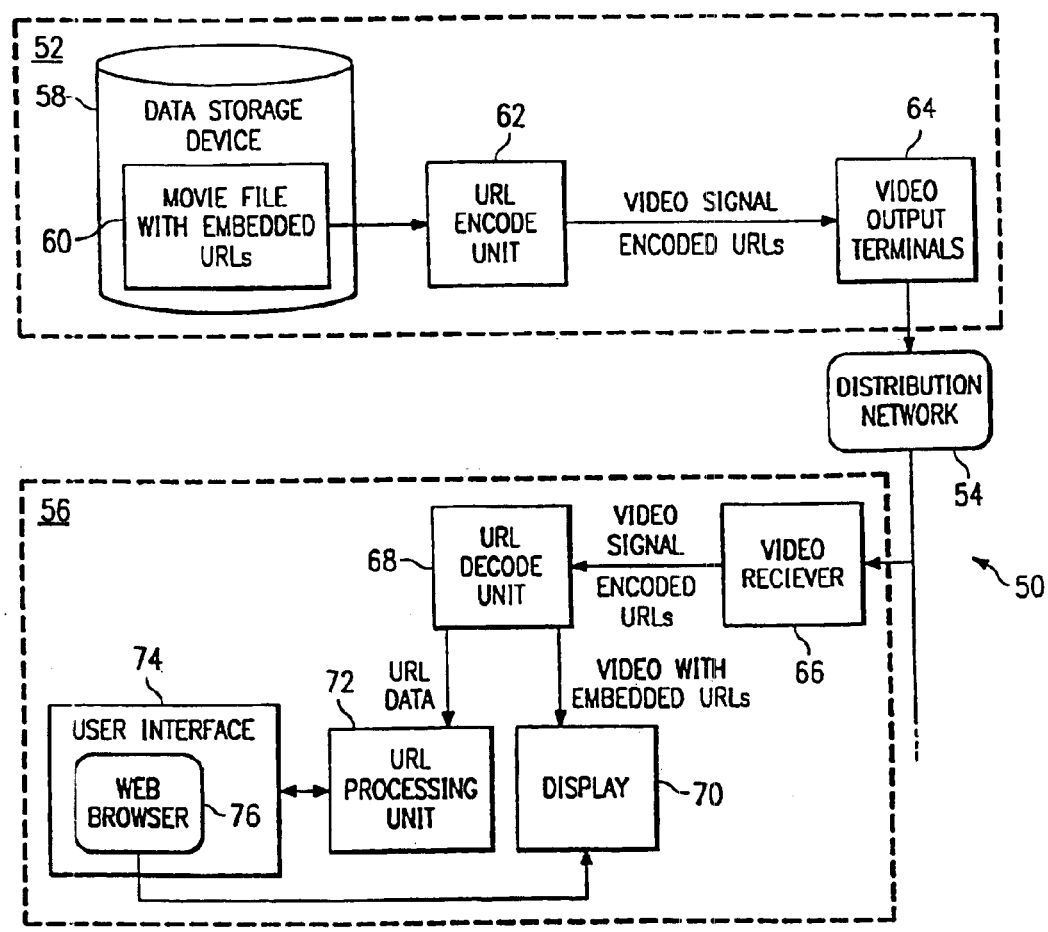
FIG. 5 is a block diagram of one embodiment of a system for distributing a video signal having encoded uniform network resource locators to a number of end points for decoding and display according to the teachings of the present invention.

FIG. 5 is a block diagram of one embodiment of a system, indicated generally at 50, for distributing a video signal having encoded uniform network resource locators to a number of end points for decoding and display. Specifically, the embodiment of FIG. 5 uses movie files with embedded Internet/intranet URLs. System 50 includes an encoding system 52, a distribution network 54, and a decoding system 56. In general, encoding system 52 is associated with a source of the video signal such as a cable network or local television station, distribution network 54 is associated with distributing the video signal such as by the cable company or local TV station, and decoding system 56 is associated with end points such as personal residences.

In the embodiment of FIG. 5, encoding system 52 includes a data storage device 58 storing, for example, one or more movie files 60 having embedded URLs. A URL encode unit 62 is coupled to data storage device 58 and is operable to read each movie file 60. URL encode unit 62 interprets movie file 60 and generate a video signal having encoded URLs based upon movie file 60. URL encode unit 62 encodes the URLs by converting the embedded URLs converted into digital information transmitted along with the video signal. This encoding can be accomplished in a manner analogous to including closed captioned data with a video signal by encoding the URL information within blanking lines at the top of each frame of the video signal. URL encode unit 62 provides the encoded video signal to video output terminals 64. Distribution network 54 receives the video signal from video output terminals 64 and transmits the video signal to a plurality of decoding systems 56. Distribution network 54 can be, for example, a cable network, direct satellite network, or direct transmission network. The video signal from video output terminals 64 could also be recorded on a fixed storage media such as a VCR tape or video disk, and the fixed storage media could be distributed rather than transmitting the video signal across a distribution network 54.

In the embodiment of FIG. 5, decoding system 56 includes a video receiver 66 which receives the video signal from distribution network 54. Video receiver 66 then provides the video signal to URL decode unit 68. URL decode unit 68 is operable to strip out the URL data from the encoded video signal. URL decode unit 68 then generates video to provide to display 70 where the video includes the embedded URLs. URL decode unit 68 also provides the decoded URL data to a URL processing unit 72. URL processing unit 72 is operable to communicate with a user interface 74 which can include a Web browser 76. URL processing unit 72 can determine based upon input from user interface 74 whether or not a user activates an active URL shown on display 70. If a URL is activated, URL processing unit 72 can invoke Web browser 76 to retrieve the resource located at the activated URL and display the resource to the user. The display provided by Web browser 76 can include displaying information on display 70. Decoding system 56 provides a smart video receiver which can receive video signals encoded with URLs, decode the video signal to separate the URLs from the video, and embed URLs in video displayed to a user. Decode system 56 can then determine when a user activates an embedded URL and follow the URL to the designated resource.

Although the present invention has been described in detail, it should be understood that various changes, substitutions and alterations can be made hereto without departing from the spirit and scope of the invention as defined by the appended claims.

What is claimed is:

1. A system for activating a uniform network resource locator displayed in a media broadcast, comprising:

a receiver device operable to receive a media broadcast having a uniform network resource locator;

a display device coupled with the receiver and being disposed to display the media broadcast to a user of the system, the media broadcast having a display time, the uniform network resource locator being displayed within the media broadcast for a predefined time that is less than the display time; and a user input device operable to allow the user to select and activate the uniform network resource locator from within the displayed output during the defined period of time.

2. The invention of claim 1, wherein the media broadcast comprises a video file having an embedded Internet/intranet uniform resource locator.

3. The invention of claim 1, wherein the media broadcast comprises an audio file having an embedded Internet/intranet uniform resource locator.

4. The invention of claim 1, wherein the media broadcast comprises a Quick Time file having an embedded Internet/intranet uniform resource locator.

5. The invention of claim 1, wherein the media broadcast comprises:

a plurality of tracks each defining a sequence of samples; and a URL track associated with one of the plurality of tracks, the URL track defining a uniform network resource locator in association with one or more samples of the associated track;

such that the uniform network resource locator is active during the media broadcast concurrent with the associated samples.

6. The invention of claim 1, further comprising a window available for display that shows a history of uniform network resource locators active at some point in the media broadcast.

7. The invention of claim 1, wherein the uniform network resource locator comprises a hot spot.

8. The invention of claim 1, wherein the uniform network resource locator comprises a hypertext link.

9. A method for activating a uniform network resource locator during a media broadcast, comprising:

receiving a media broadcast transmitted via a distribution network:

displaying the media broadcast;

displaying a uniform network resource locator in the media broadcast, the media broadcast having a display time, the uniform network resource locator displayed and active for a defined period of time less than the media broadcast display time; and activating the uniform network resource locator from within the displayed media broadcast during the defined period of time.

10. The method of claim 9 wherein the media broadcast comprises a video signal.

11. The method of claim 10, wherein the uniform network resource locator is embedded in the video signal by associating the uniform network resource locator with a track in the video signal.

12. The method of claim 10, wherein embedding the uniform network resource locator comprises embedding the uniform network resource locator in an audio signal by associating the uniform network resource locator with a track in the audio signal.

13. The method of claim 9, wherein the uniform network resource locator comprises an Internet/intranet uniform resource locator.

14. The method of claim 9, wherein the uniform network resource locator comprises a hot spot.

15. The method of claim 9, wherein the uniform network resource locator comprises a hypertext link.

* * * * *

UNITED STATES PATENT AND TRADEMARK OFFICE
CERTIFICATE OF CORRECTION

PATENT NO. : 6,963,906 B2 Page 1 of 1
APPLICATION NO. : 10/329080
DATED : November 8, 2005
INVENTOR(S) : Portuesi It is certified that error appears in the above-identified patent and that said Letters Patent is hereby corrected as shown below:

On the Title page, in Item (63), under "Related U.S. Application Data" in column 1, line 2, after "6,499,057," insert -- which is a continuation of application No. 09/105,811, filed on Jun. 26, 1998, now Pat No. 5,987,509, --.

On the Title page, in Item (63), under "Related U.S. Application Data" in column 1, line 3, delete "1994," and insert -- 1996, --, therefor.

In column 1, line 8, after "2002)" insert -- , --.

In column 1, line 9, delete "09/105,011," and insert -- 09/105,811, --, therefor.

In column 1, line 12, delete "1994" and insert -- 1996 --, therefor.

In column 6, line 3, delete "18;" and insert -- 18. --, therefor.

In column 6, line 67, delete "data," and insert -- data. --, therefor.

In column 10, line 34, in Claim 9, delete "network:" and insert -- network; --, therefor.

Signed and Sealed this

Thirtieth Day of March, 2010

David J. Kappos
*Director of the United States Patent and Trademark Office*